United States Patent
Kawasumi et al.

(10) Patent No.: US 8,529,419 B2
(45) Date of Patent: Sep. 10, 2013

(54) MACHINE TOOL

(75) Inventors: Masahiro Kawasumi, Shizuoka (JP); Satoru Ozawa, Shizuoka (JP)

(73) Assignee: Star Micronics Co., Ltd., Shizouka-Shi, Shizuoka (JP)

( * ) Notice: Subject to any disclaimer, the term of this patent is extended or adjusted under 35 U.S.C. 154(b) by 1022 days.

(21) Appl. No.: 12/257,035

(22) Filed: Oct. 23, 2008

(65) Prior Publication Data

US 2009/0116915 A1    May 7, 2009

(30) Foreign Application Priority Data

Nov. 5, 2007  (JP) ................................. 2007-287058

(51) Int. Cl.
*B23Q 3/155*    (2006.01)

(52) U.S. Cl.
USPC ................... 483/14; 483/18; 483/16; 483/20; 29/27 R; 82/124; 82/120; 82/129

(58) Field of Classification Search
USPC ............. 483/18, 20, 16, 14–15, 13; 29/27 R, 29/27 C; 82/124, 120–121, 129
See application file for complete search history.

(56) References Cited

U.S. PATENT DOCUMENTS

| | | | | |
|---|---|---|---|---|
| 5,803,886 | A | * | 9/1998 | Schweizer ...................... 483/31 |
| 6,352,496 | B1 | * | 3/2002 | Oldani ............................ 483/55 |
| 2005/0036845 | A1 | | 2/2005 | Taniguchi et al. |
| 2006/0236514 | A1 | | 10/2006 | Sasazawa et al. |

FOREIGN PATENT DOCUMENTS

| | | | |
|---|---|---|---|
| EP | 0941790 A1 | | 9/1999 |
| GB | 2271945 A | * | 5/1994 |
| JP | 1-240201 | | 9/1989 |
| JP | 05031601 A | | 2/1993 |
| JP | 07-290331 A | * | 11/1995 |
| JP | 2760749 | | 11/1995 |
| JP | 10-094939 A | * | 4/1998 |
| JP | 2002-263909 | | 9/2002 |
| JP | 2004042152 A | | 2/2004 |
| JP | 2005-169582 A | | 6/2005 |
| JP | 2006281389 A | | 10/2006 |
| JP | 2006-305710 A | | 11/2006 |
| JP | 2007098529 A | | 4/2007 |

OTHER PUBLICATIONS

Machine Translation of JP-07-290331, which JP '331 was published in Nov. 1995.*
Machine Translation of EP 941790, which EP '790 was published in Sep. 1999.*
Extended European Search Report for Application No. 08167414.5-2302, mailed on Feb. 17, 2009 (6 pages).

(Continued)

*Primary Examiner* — Erica E Cadugan
(74) *Attorney, Agent, or Firm* — Osha Liang LLP

(57) ABSTRACT

A machine tool includes: a main spindle adapted to be rotatable with a workpiece chucked thereby; a tool spindle capable of moving in directions of three axes perpendicular to each other and capable of pivoting about one of the axes, the axis being perpendicular to the main spindle; an automatic tool changer adapted to detachably attach a first tool and a chucking unit to the tool spindle, the first tool being used for machining the workpiece chucked by the main spindle, the chucking unit being used for chucking the workpiece; and a tool post having a second tool mounted thereon, the second tool being used for machining the workpiece chucked by the chucking unit attached to the tool spindle.

12 Claims, 13 Drawing Sheets

(56) References Cited

OTHER PUBLICATIONS

Patent Abstracts of Japan for Japanese Publication No. 01-240201, Publication date Sep. 25, 1989 (1 page).
Patent Abstracts of Japan for Japanese Publication No. 2002-263909, Publication date Sep. 17, 2002 (I1 page).
Patent Abstracts of Japan for JApanese Publication No. 07-290331, Publication date Nov. 7, 1995 (1 page).
Notice of Reasons for Rejection (Office Action) mailed Nov. 27, 2012, from the Japan Patent Office in related Japanese Patent Application No. JP 2007-287058, with English translation (9 pages).
Patent Abstracts of Japan English Abstract for Japanese Publication No. 2005-169582 (1 page), which JP '582 was published Jun. 2005.
Patent Abstracts of Japan English Abstract for Japanese Publication No. 2006-305710 (1 page), which JP '710 was published Nov. 2006.
Office Action Issued in Japanese Application No. 2007-287058, Dated Jul. 31, 2012 (9 Pages With English Translation).
Patent Abstracts of Japan for Japanese Publication No. 05-031601, Publication Date: Feb. 9, 2012 (1 Page).
Patent Abstracts of Japan for Japanese Publication No. 2006-281389, Publication Date: Oct. 19, 2006 (1 Page).
Patent Abstracts of Japan for Japanese Publication No. 2004-042152, Publication Date: Feb. 12, 2004 (1 Page).
Patent Abstracts of Japan for Japanese Publication No. 2007-098529, Publication Date: Apr. 19, 2007 (1 Page).

* cited by examiner

MACHINE TOOL

BACKGROUND

1. Field of the Invention

The present invention relates to a machine tool.

2. Description of the Related Art

A machine tool such as a numerical control lathe (NC lathe) is conventionally used to manufacture desired precision parts by performing front-machining and back-machining operations on a workpiece.

FIG. 12 is a schematic illustration showing a conventional NC lathe 1. The NC lathe 1 includes: a headstock 3 having a main spindle 2 chucking a workpiece W for a front-machining operation; and a backworking attachment 4 opposed to the headstock 3 in a direction of the main spindle 2 (in a direction of Z-axis). The backworking attachment 4 includes a sub spindle 5 for chucking the workpiece W for a back-machining operation. The NC lathe 1 includes a tool spindle stock 7 having a tool spindle 6. The main spindle 2 and the sub spindle 5 is under rotation control about Z-axis (C1-axis control) by a computer (not shown) according to a predetermined program. The tool spindle stock 7 is under movement control in the direction of Z-axis and also in directions perpendicular to the direction of Z-axis (in a direction of X-axis or Y-axis). The tool spindle 6 is under rotation control about the axis of the tool spindle 6 (C2-axis control). The tool spindle stock 7 is also under pivoting control about the direction of Y-axis (B-axis control)

In the configuration described above, a front-machining operation is performed on the workpiece W chucked by the main spindle 2 with a tool 8 attached to the tool spindle 6. The workpiece W is detached from the main spindle 2 and then chucked by the sub spindle 5. A back-machining operation is performed on the workpiece W chucked by the sub spindle 5 with the tool 8 attached to the tool spindle 6. The tool 8 used for a back-machining operation may be different from the tool used for a front-machining operation. The direction of Y-axis shown in FIG. 12 is perpendicular to a plane of paper.

In a known vertical machining center, a tool and a workpiece chucking unit are detachably attached to a main spindle by using an automatic tool changer (ATC), with the workpiece chucking unit being co-rotatable with the main spindle. (see JP-B-2760749).

Further, in another known machine tool, a workpiece clumping unit is attached to a pivotable tool spindle stock by using an ATC, and a workpiece is detachably attached to a headstock by the clumping unit (see JP-A-2002-263909).

In another known secondary machining device in an automatic lathe, an L-shaped pivoting unit has, at each protruding portion: a tool spindle for automatically mounting a secondary machining tool for performing a front-machining operation on a workpiece chucked by a main spindle; and a sub spindle for performing a back-machining operation on the workpiece that was cut off after the front-machining operation was performed (see JP-A-1-240201).

The following problems may be encountered in the related art described above.

In the NC lathe 1 shown in FIG. 12, the backworking attachment 4 is provided to perform a back-machining operation. Therefore, a size of the NC lathe 1 in the direction of Z-axis must be a total of the lengths in the longitudinal direction of the headstock 3, the tool spindle stock 7 and the backworking attachment 4, to which a total of the lengths of the workpiece W and the tool 8 is further added. Therefore, the device is very large.

In JP-B-2760749 described above, movement of the main spindle is limited to rotation around the axis and travelling in the directions of X, Y and Z. Therefore, in order to set a workpiece on a rotary table, the axis rotation of which is directed in the horizontal direction, it is necessary to prepare another chucking unit different from the chucking unit of the main spindle, capable of rotating the workpiece in the vertical and horizontal directions. Therefore, the apparatus cost is raised. Since movement of the main spindle is limited as described above, it is difficult to operate precise machining on an inclined face of the workpiece. Therefore, a machining ability is not sufficient.

In JP-A-2002-263909 described above, an elbow-shaped workpiece is shown, whose center of axis at both ends are different from each other. The elbow-shaped workpiece can be delivered by a clamping member attached to the tool spindle stock from a first headstock to a second headstock in such manner that the center of axis of the workpiece may be coaxially aligned with the headstock. However, a machining operation is always performed under the condition that the workpiece is attached to the first headstock and the second headstock. Therefore, in the same manner as that of the conventional NC lathe 1 shown in FIG. 12, the machine becomes very large. In addition to that, it is necessary to provide two headstocks and a tool spindle stock. Accordingly, the apparatus cost is raised.

In JP-A-1-240201 described above, in order to perform a front-machining operation (a secondary machining operation in a front-machining operation) and a back-machining operation on a workpiece, it is necessary to provide an L-shaped pivoting unit having a sub spindle and a tool spindle stock respectively formed in the protruding ends. Therefore, the apparatus becomes large in its configuration and further the cost is raised.

The present invention has been accomplished in view of the above problems. An object of an embodiment of the present invention is to provide a machine tool capable of performing various machining operations including a back-machining operation on a workpiece in a smaller apparatus configuration at a lower apparatus cost.

SUMMARY

In order to accomplish the above object, one aspect of the machine tool of the invention includes: a main spindle adapted to be rotatable with a workpiece chucked thereby; a tool spindle capable of moving in directions of three axes perpendicular to each other and capable of pivoting about one of the axes, the axis being perpendicular to the main spindle; an automatic tool changer adapted to detachably attach a first tool and a chucking unit to the tool spindle, the first tool being used for machining the workpiece chucked by the main spindle, the chucking unit being used for chucking the workpiece; and a tool post having a second tool mounted thereon, the second tool being used for machining the workpiece chucked by the chucking unit attached to the tool spindle.

With this arrangement, a front-machining operation is performed on the workpiece chucked by the main spindle by using the first tool attached to the tool spindle. The workpiece, one of whose ends (front-end) has been machined, is carried by the chucking unit attached to the tool spindle to a position where the second tool of the tool post is possibly applied, then a back-machining operation is performed on the other end of the workpiece. As described above, according to the present invention, without providing the conventional backworking attachment, front and back-machining operations can be performed on the workpiece. Accordingly, the entire apparatus can be downsized and the apparatus cost can be reduced. Since the tool spindle is pivotable, a precise machining on an inclined face is easily available in both front and back-machining operations.

In another embodiment of the present invention, the tool post may be capable of moving the second tool on a plane containing the main spindle, and the second tool may be used for machining the workpiece chucked by the main spindle.

With this arrangement, a front-machining operation on the workpiece can be performed by using the first tool and the second tool. In the case where a bar material is supplied to the main spindle, a front-machining operation is performed on the bar material and the machined portion is chucked by the chucking unit attached to the tool spindle. The second tool is then applied to the bar material to cut off a piece of a predetermined length including the machined portion. Then, a back-machining operation is performed on the cut off piece or the workpiece. In addition to that, during the change of tools on the tool spindle, a machining can be performed on the workpiece chucked by the main spindle with the second tool.

As another embodiment of the present invention, the above machine tool may further include a workpiece carrier adapted to carry the workpiece within reach of the chucking unit attached to the tool spindle, wherein the tool spindle picks up the workpiece by using the chucking unit from the workpiece carrier and returns the workpiece chucked by the chucking unit to the workpiece carrier. To be more specific, the workpiece carrier includes a pallet to carry the workpiece and a pallet carrier to move the pallet, and the tool spindle picks up the workpiece from the pallet moved by the pallet carrier within reach of the chucking unit and returns the workpiece to the pallet.

With this arrangement, the workpiece is delivered to a neighborhood of the tool spindle by the workpiece carrier and the workpiece is picked up by the tool spindle from the workpiece carrier (pallet) and delivered to the main spindle. The finished workpiece can be returned to the workpiece carrier (pallet) by the tool spindle. Therefore, time required for a series of operations can be shortened including the delivery of the pre-machined workpiece to the main spindle and the return of the finished workpiece to the pallet.

As another embodiment of the present invention, the tool spindle supplies pressurized coolant to the chucking unit through a supply passage formed in the tool spindle and the chucking unit is opened and closed according to the supply of the coolant. High-pressure coolant is much stronger than compressed air in pressure applied to the chucking unit. Therefore, powerful and accurate operation of the chucking unit is available.

BRIEF DESCRIPTION OF THE DRAWINGS

Embodiment may be described in detail with reference to the accompanying drawings, in which.

DETAILED DESCRIPTION OF THE EMBODIMENTS

Figure 1:
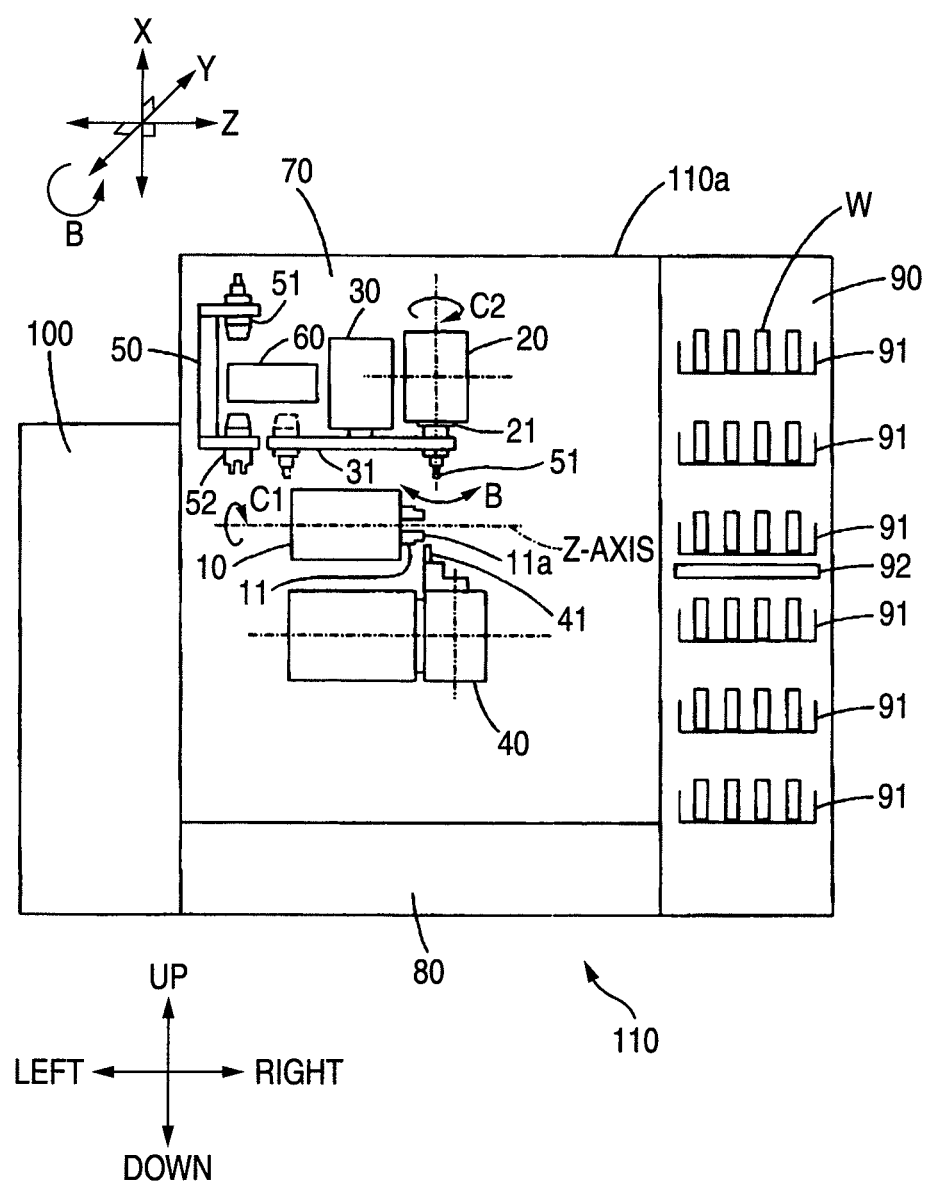
FIG. 1 is a schematic illustration showing a configuration of an NC lathe in accordance with one embodiment of the present invention.

Referring to the drawings, embodiments of the present invention will be explained.

FIG. 1 is a schematic illustration showing a configuration of an NC lathe 110 of the present embodiment, wherein the configuration is exemplarily showing from one side. The NC lathe 110 is one type of machine tools. A machining chamber 70, a coolant tank 80, and a pallet station 90 are provided in a housing 110a of the NC lathe 110. A headstock 10, a tool spindle stock 20, an ATC (Automatic Tool Changer) 30, a tool post 40, a tool magazine 50 and an intermediate station 60 are respectively arranged at predetermined positions in the machining chamber 70.

In an example shown in FIG. 1, the coolant tank 80 is provided in a lower part of the machining chamber 70 and stores coolant inside. The pallet station 90 is provided being adjacent to the machining chamber 70 to accommodate a plurality of pallets 91. The pallet 91 is configured to carry a workpiece W inside and outside the machining chamber 70. It is possible to put a certain number of workpieces W on the pallet 91.

The NC lathe 110 includes an NC unit 100 outside (or inside) the housing 110a. The NC unit 100 mainly includes a computer. Further, the NC unit 100 includes: a display (not shown) which displays a screen for a user; and an operation receiving portion (not shown) such as buttons for receiving operation made by the user. According to a predetermined machining program, in response to a command from the NC unit 100, a component in the housing 110a including the headstock 10, the tool headstock 20, the ATC 30, the tool post 40, the tool magazine 50, and the intermediate station 60 is individually numerically controlled with respect to a position and a state of operation (movement, rotation, pivoting and so forth). Each operation explained below can be basically realized under control of the NC unit 100.

The headstock 10 has a main spindle 11 extending in the direction of Z-axis. The headstock 10 performs rotation control of the main spindle 11. Rotation control includes control of spindle speed and control of rotation angle so called C1-axis control. In the example shown in FIG. 1, Z-axis is extending in the lateral direction (the horizontal direction). The main spindle 11 is configured to clamp the workpiece W by a chuck 11a provided at its front end portion.

The tool spindle stock 20 has a tool spindle 21. At the initial position shown in FIG. 1, that is, at a predetermined position above the main spindle 11, an axis of the tool spindle stock 20 is extending in the vertical direction (the direction of X-axis). The tool spindle stock 20 performs rotation control about the center of the axis of the tool spindle 21. Rotation control includes control of spindle speed and control of rotation angle so called C2-axis control. The tool spindle stock 20 is configured to be moved in the axial direction of Z-axis which is a direction of the center of the axis of the main spindle 11, in the direction of X-axis which is an advance and retreat direction of the tool 51 with respect to the workpiece W and in the direction of Y-axis which is perpendicular to the directions of X-axis and Z-axis. The direction of Y-axis shown in FIG. 1 (also shown in FIGS. 2 to 10) is perpendicular to the paper surface of the drawing. Further, the tool spindle stock 20 is pivotally controlled about the Y-axis (B-axis control). In other words, the tool spindle stock 20 can be pivoted on a plane perpendicular to the direction of Y-axis.

The ATC 30 is configured to attach or detach the tool 51 (corresponding to the first tool) for machining the workpiece W and a chucking unit 52 for chucking the workpiece W, to or from the tool spindle 21 of the tool spindle stock 20 located at the initial position. Although simplified in FIG. 1, a plurality of types of tools 51 and chucking units 52 are mounted on the tool magazine 50. For example, the ATC 30 with a turning arm 31 picks up the tool 51 from the tool magazine 50. The turning arm 31 is rotated to cause the tool 51 to be positioned in place with respect to the tool spindle 21. In the example shown in FIG. 1, the turning action is operated on the horizontal face. In case of detachment of the tool 51 from the tool spindle 21, the turning arm 31 is rotated to cause the detached tool 51 to be returned to the tool magazine 50. In this embodiment, the intermediate station 60 is interposed between the ATC 30 and the tool magazine 50 to support delivery of the tool 51 therebetween.

The tool post 40 is provided with a tool 41 (corresponding to the second tool) for machining the workpiece W. In the example shown in FIG. 1, the tool post 40 is arranged below the main spindle 11. At a front end portion of the tool post 40 (on the right side in FIG. 1), a turret is arranged. The turret has a plurality of faces having the tool 41 mounted thereon.

The tool 41 may be a stationary tool or a rotary tool. In the example shown in FIG. 1, the tool 41 protrudes in the direction of X-axis. The tool 41 is arranged on a plane containing the axis of the main spindle 11. In this example, the plane may be perpendicular to the direction of Y-axis (an example of the plane containing the main spindle 11). With this arrangement, the tool post 40 is movable in the directions of X-axis and Z-axis. Further, the tool post 40 may be movable in the direction of Y-axis.

Machining operation on the workpiece W performed by the NC lathe 110 will be explained below.

First, the chucking unit 52 for chucking a pre-machined workpiece W is attached to the tool spindle 21. Particularly, the chucking unit 52 suitable for chucking the pre-machined workpiece W is picked up from the tool magazine 50. Then, by the action of the ATC 30 described above (also by the action of the intermediate station 60), the chucking unit 52 is attached to the tool spindle 21 of the tool spindle stock 20 located at the initial position.

Next, the pre-machined workpiece W is taken by the chucking unit 52 attached to the tool spindle 21.

Figure 2:
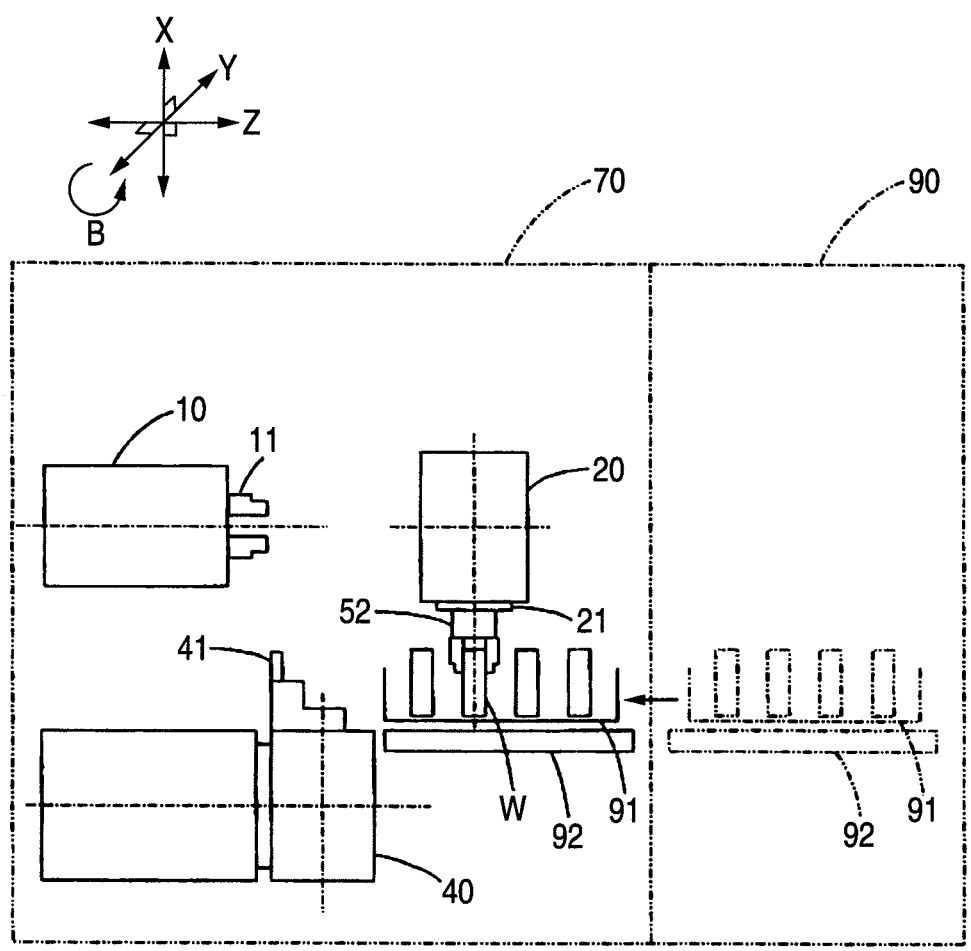
FIG. 2 is a schematic illustration showing how a workpiece is taken from a pallet.

FIG. 2 is an example showing how the workpiece W is taken by the chucking unit 52. In FIG. 2 (in FIGS. 3 to 9), the ATC 30, the tool magazine 50, the intermediate station 60, the coolant tank 80, the NC unit 100 and others are omitted.

A pallet 91 having a certain number of workpieces W mounted thereon is moved from the pallet station 90 by the pallet carrier 92 to a predetermined pallet movement position in the machining chamber 70. The pallet 91 and the pallet carrier 92 correspond to an example of the workpiece carrier.

In the embodiment, the pallet movement position is defined as a certain position in a space as far as the workpiece W mounted on the pallet 91 can be reached by the chucking unit 52 attached to the tool spindle stock 20 (the tool spindle 21) capable of moving in the directions of X-axis, Y-axis and Z-axis.

The pallet carrier 92 may be a mechanism capable of moving the pallet 91 from the pallet station 90 to the pallet movement position and also capable of moving the pallet 91 from the pallet movement position to the pallet station 90. For example, the pallet carrier 92 includes: a carrying device for horizontally carrying the pallet 91; and an elevator for moving up and down the pallet 91 in the pallet station 90. Movement of the pallet carrier 92 is also controlled by the NC unit 100.

The tool spindle stock 20 having the chucking unit 52 attached thereto is moved to a position in the X-axis direction opposed to the pre-machined workpiece W mounted on the pallet 91 at the pallet movement position. The tool spindle stock 20 is further moved in the direction of X-axis closer to the workpiece W. Then, the chucking unit 52 chucks the workpiece W by operating a pair of chucking pawls provided at a front end of the chucking unit.

Figure 11:
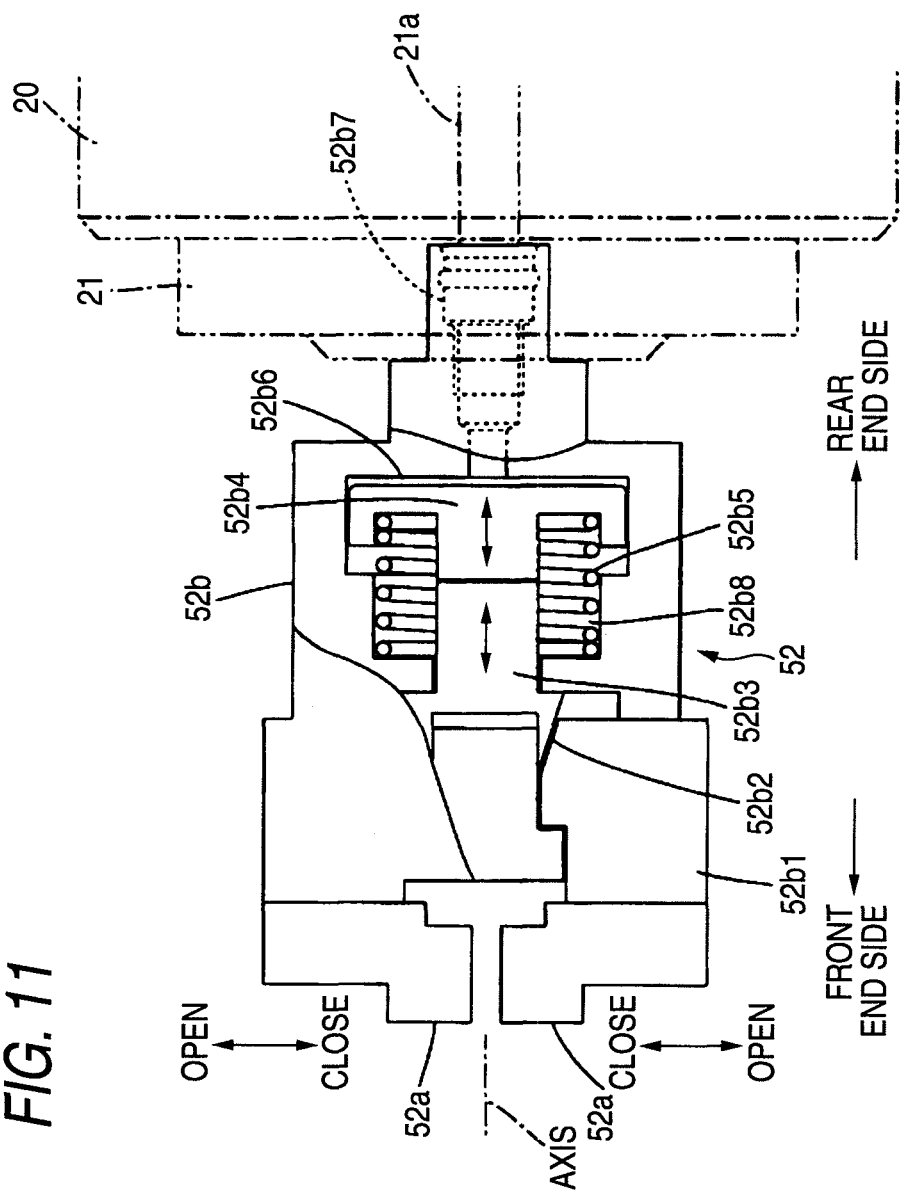
FIG. 11 is a partially sectional view showing a chucking unit and others.
Figure 12:
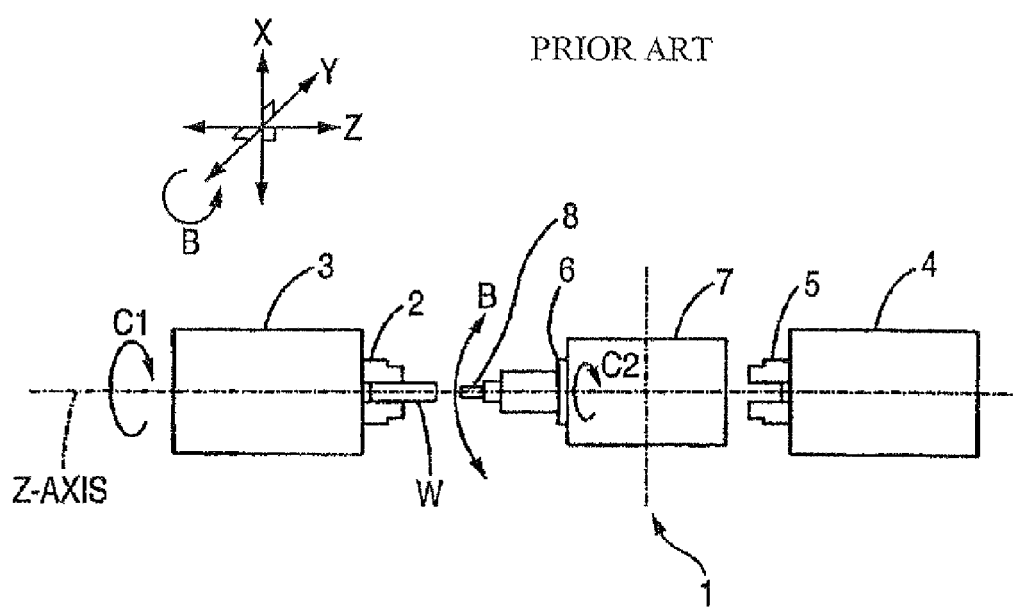
FIG. 12 is a schematic illustration showing a configuration of a conventional NC lathe.

FIG. 11 is a partially sectional view showing a configuration of the chucking unit 52. However, in FIG. 11, for the convenience of seeing the view, hatching lines in the cross sectional portion are omitted. The chucking unit 52 includes a pair of chucking pawls 52a to be into contact with the workpiece W and a chuck body 52b to be attached to the tool spindle 21. The connecting portion 52b7 having a configuration compatible with a predetermined standard is provided at a rear end part of the chuck body 52b. When the rear end part of the chuck body 52b is inserted into the tool spindle 21, the connecting portion 52b7 is engaged with a central part on the tool spindle 21 side. Therefore, the chucking unit 52 is attached to the tool spindle 21.

The chuck body 52b includes a coolant inflow space 52b6, a piston 52b4, a compression spring 52b5, a shifter 52b3, and a master jaw 52b1. In the embodiment, in order to put the chucking pawls 52a into an open state, pressurized coolant (high pressure coolant) is supplied into the coolant inflow space 52b6 through a coolant supply passage 21a formed in the tool spindle 21 and the connecting portion 52b7. An appropriate pressure of coolant may be, for example, approximately 7.0 MPa.

In a piston moving space 52b8 of the chuck body 52b, a piston 52b4 is urged toward the rear end side of the chuck body 52b by the compression spring 52b5. Without high pressure coolant in the coolant inflow space 52b6, the compression spring 52b5 is most extended in the piston moving space 52b8 and the chucking pawls 52a are put into a closed state.

The inflow of high pressure coolant into the coolant inflow space 52b6 is started by control of the NC unit 100 to put the chucking pawls 52a into an open state. The piston 52b4 is pushed by high pressure coolant and displaced in the moving space 52b8 toward a front end side of the chucking unit 52. Accordingly, the shifter 52b3 fixed to the piston 52b4 is also displaced in the chuck body 52b toward the front end side of the chucking unit 52. In this example, the shifter 52b3 is formed into a tapered profile toward the front end side of the chucking unit 52. Particularly, a face 52b2 of the shifter 52b3 that is in contact with the master jaw 52b1 is obliquely cut off. The master jaw 52b1 is configured to be slidable in a direction perpendicular to the axis of the tool spindle 21 while prohibited from moving in the axial direction of the tool spindle 21 in the chuck body 52b. The chucking pawls 52a are fixed to the master jaw 52b1. Accordingly, when the shifter 52b3 is displaced toward the front end side of the chucking unit 52, the master jaw 52b1 is pushed out by the face 52b2 in a direction away from the axis of the tool spindle 21. At the same time, the chucking pawls 52a are also displaced in a direction away from the axis of the tool spindle 21, thereby, the chucking pawls 52a are opened.

On the other hand, when the inflow of high pressure coolant is stopped by control of the NC unit 100, the piston 52b4 is urged toward the rear end side of the chucking unit 52 by the compression spring 52b5. Therefore, high pressure coolant is forced out of the coolant inflow space 52b6. With the displacement of the piston 52b4, the shifter 52b3 is also displaced toward the rear end side of the chucking unit 52. Accordingly, the master jaw 52b1 and the chuck pawls 52a are brought into the original positions closer to the axis of the tool spindle 21, thereby, the chucking pawls 52a are closed.

In the embodiment described above, the chucking pawls 52a are opened and closed by the inflow and outflow of high pressure coolant into and from the chuck body 52b.

After the pre-machined workpiece W is chucked by the chucking unit 52, the tool spindle stock 20 delivers the workpiece W to the main spindle 11.

Figure 3:
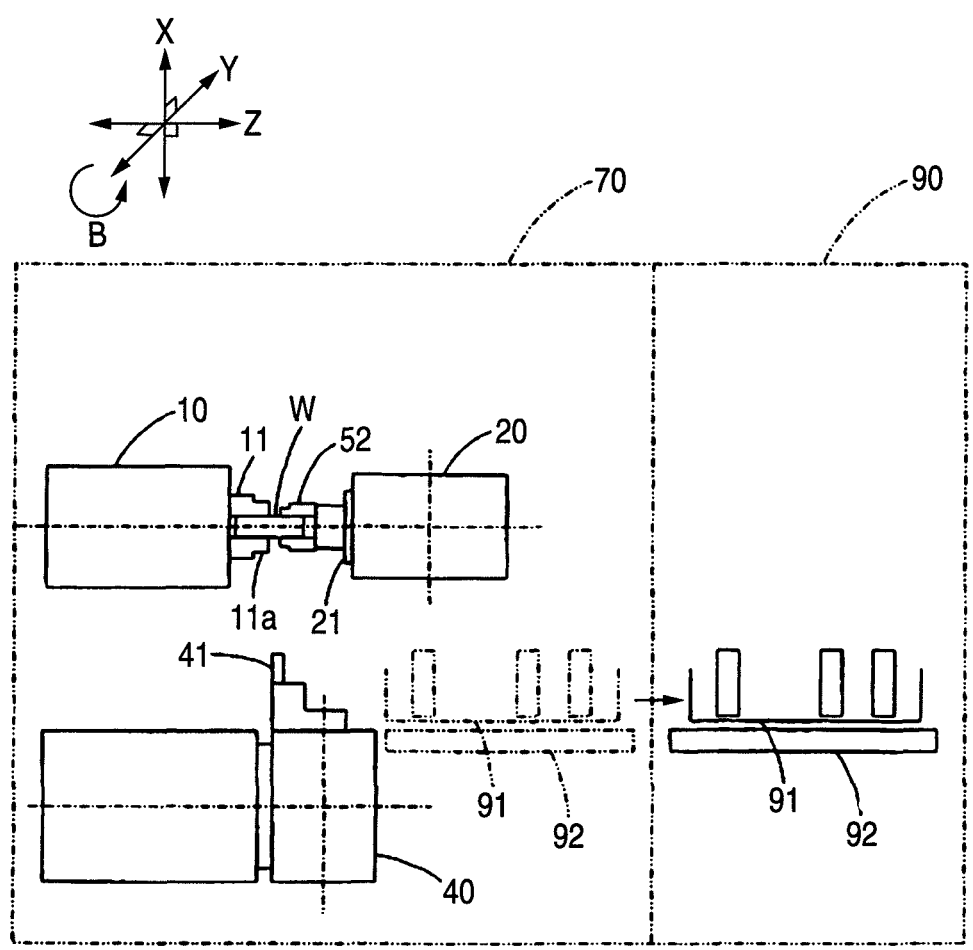
FIG. 3 is a schematic illustration showing how a workpiece is supplied to a main spindle.

FIG. 3 is a schematic illustration showing how the pre-machined workpiece W is supplied to the main spindle 11. The tool spindle stock 20 is moved from the position where it took the pre-machined workpiece W from the pallet 91, to a predetermined position close to the main spindle 11. Further, the tool spindle stock 20 is pivoted by B-axis control as described above, so that the workpiece W chucked by the chucking unit 52 may be coaxially positioned with respect to the main spindle 11. Then, the tool spindle stock 20 is brought close to the headstock 10 to deliver the workpiece W to the main spindle 11. The workpiece W is then clamped by the chuck 11a of the main spindle 11.

Next, the chucking unit 52 attached to the tool spindle 21 is replaced with the tool 51 for performing a front-machining operation on the workpiece W. The tool spindle stock 20 is returned to the initial position from the position where the workpiece W is delivered to the main spindle 11. With cooperation between the ATC 30 and the intermediate station 60, the chucking unit 52 is detached from the tool spindle 21 of the tool spindle stock 20 located at the initial position, and returned to the tool magazine 50. Then, the tool 51 suitable for front-machining is picked up from the tool magazine 50 and attached to the tool spindle 21. During the change of the chucking unit 52 and the tool 51, the tool 41 of the tool post 40 may be applied to the workpiece W chucked by the main spindle 11 to perform a front-machining operation.

Next, a front-machining operation is performed on the workpiece W chucked by the main spindle 11.

Figure 4:
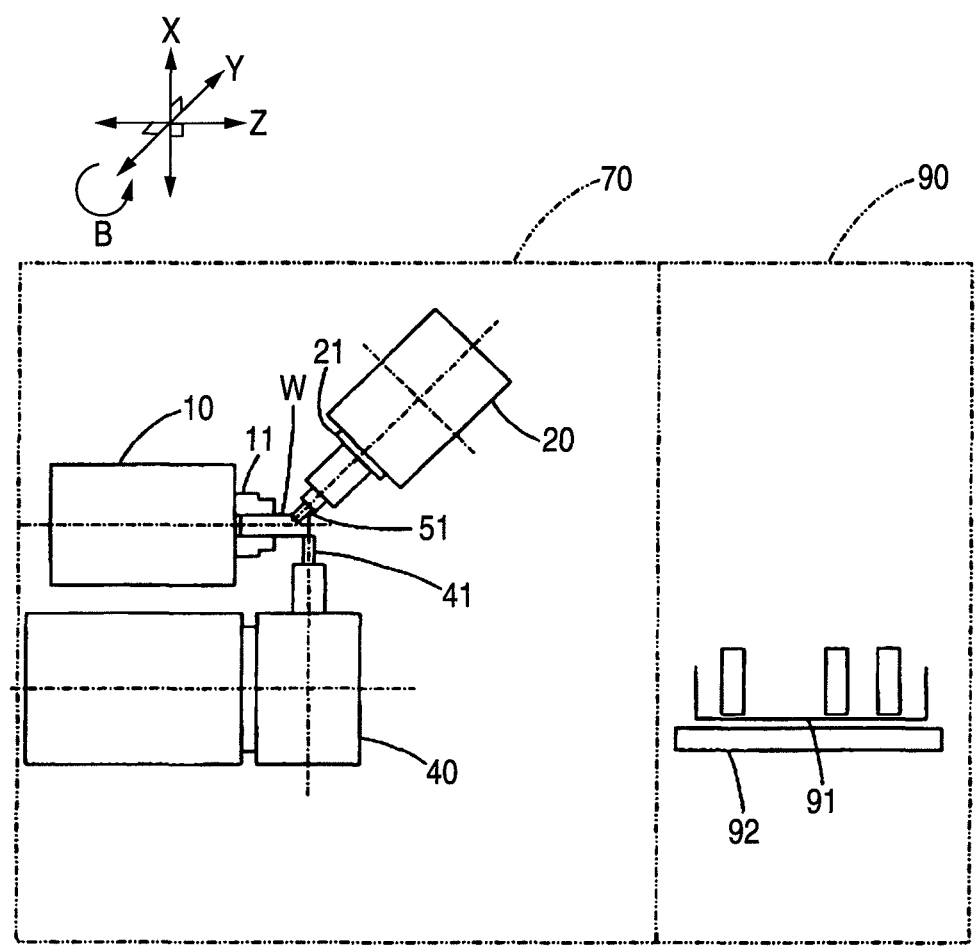
FIG. 4 is a schematic illustration showing how a front-machining operation is performed on a workpiece.

FIG. 4 is a schematic illustration showing how a front-machining operation is performed on the workpiece W. With the tool 51 attached to the tool spindle 21, the tool spindle stock 20 is moved to a predetermined position at which the tool 51 is possibly in contact with the workpiece W chucked by the main spindle 11. Then, the tool 51 is applied to the workpiece W to perform a predetermined machining operation. It is possible to perform various machining operations on an end face of the workpiece W such as turning, cross hole drilling or end hole drilling. As described before, the tool spindle stock 20 may be pivoted under B-axis control. Therefore, as shown in FIG. 4, the tool 51 may be applied to the workpiece W with the axis of the tool spindle 21 inclined with respect to the axis of the main spindle 11, thereby, providing a precise machining on an inclined face of the workpiece W.

Figure 5:
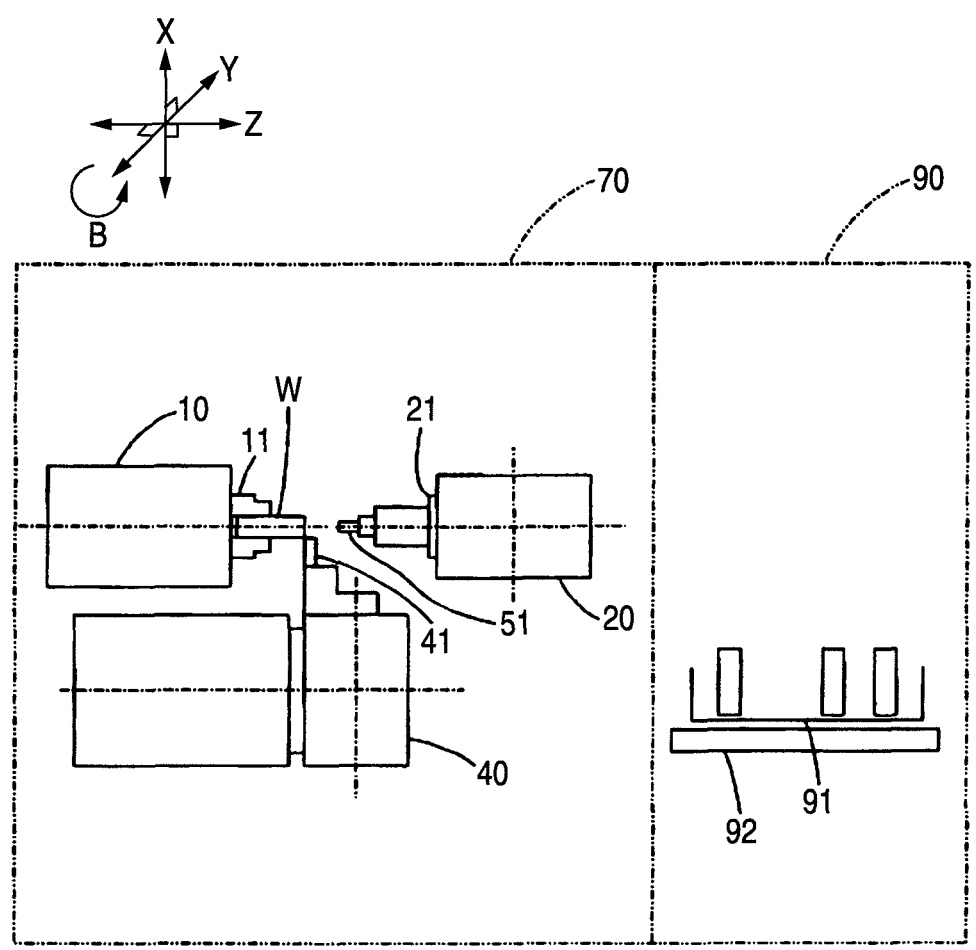
FIG. 5 is another schematic illustration showing how a front-machining operation is performed on a workpiece.

A front-machining on the workpiece W can be performed by using the tool 51 attached to the tool spindle 21. A front-machining on the workpiece W can be also performed by using the tool 41 mounted on the tool post 40. In this case, as shown in FIG. 4, both the tool 51 and the tool 41 may be simultaneously applied to the workpiece W. Alternatively, as shown in FIG. 5, the tool 51 and the tool 41 may be separately applied to the workpiece W at different timing. As described before, the tool post 40 is movable in the directions of X-axis and Z-axis on a plane containing the axis of the main spindle 11, which is perpendicular to the direction of Y-axis. Therefore, by movement of the tool post 40, the tool 41 can be applied to the workpiece W chucked by the main spindle 11.

Next, the tool 51 is detached from the tool spindle 21 and the chucking unit 52 is attached to the tool spindle 21. The tool spindle stock 20 is returned to the initial position from the position where the front-machining is performed. With cooperation between the ATC 30 and the intermediate station 60, the tool 51 is detached from the tool spindle 21 of the tool spindle stock 20 located at the initial position, and returned to the tool magazine 50. The chucking unit 52 suitable for clamping the machined front end of the workpiece W is picked up from the tool magazine 50 and attached to the tool spindle 21. During the change of the tool 51 and the chucking unit 52, the tool 41 of the tool post 40 may be applied to the workpiece W chucked by the main spindle 11 for a front-machining operation.

Next, the tool spindle stock 20 takes the workpiece W, one of whose ends (front-end) has been machined, from the main spindle 11.

Figure 6:
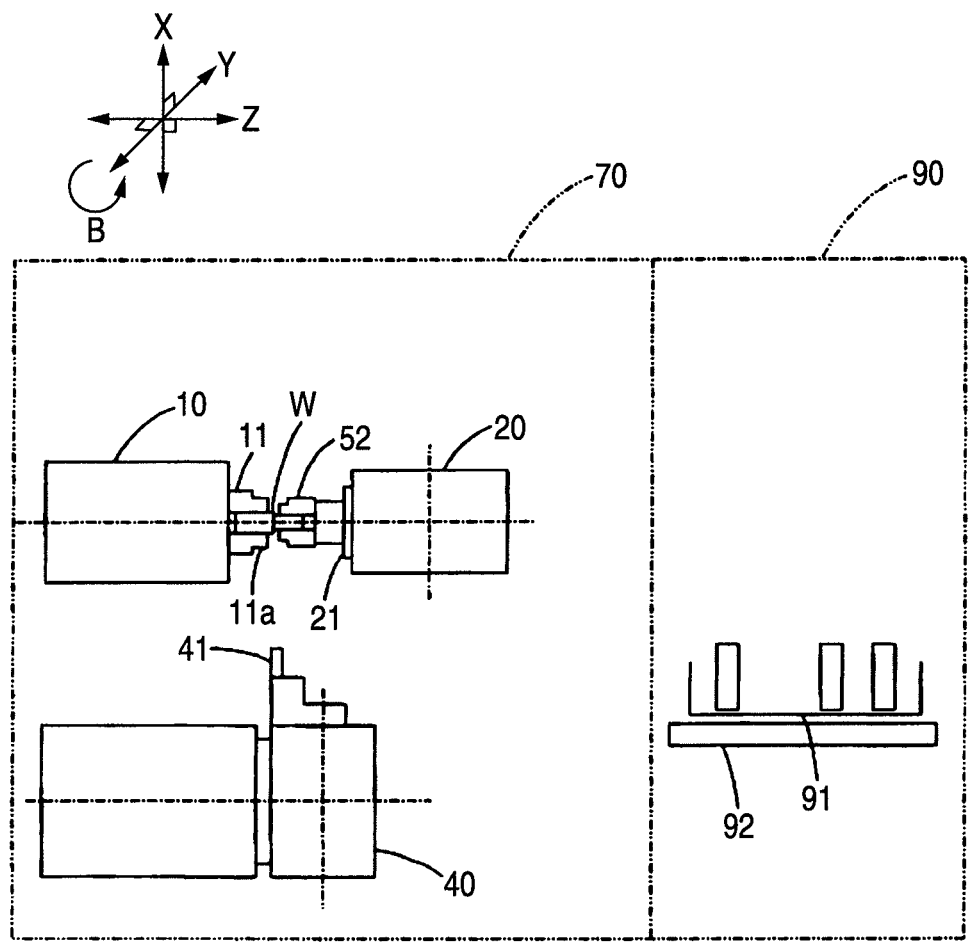
FIG. 6 is a schematic illustration showing how a workpiece is taken from a main spindle.

FIG. 6 is a schematic illustration showing how the workpiece W, whose front-end has been machined, is taken from the main spindle 11. The tool spindle stock 20 is moved from the initial position to a position close to the main spindle 11 with the tool spindle 21 coaxially positioned with respect to the main spindle 11 under B-axis control. Then, the tool spindle stock 20 is brought closer to the headstock 10, and the chucking unit 52 chucks the workpiece W at the machined end thereof. At this time, the main spindle 11 releases the chuck 11a to free the workpiece W.

Next, with the workpiece W clamped by the chucking unit 52 attached to the tool spindle 21, a back-machining operation is performed on the other end of the workpiece W.

Figure 7:
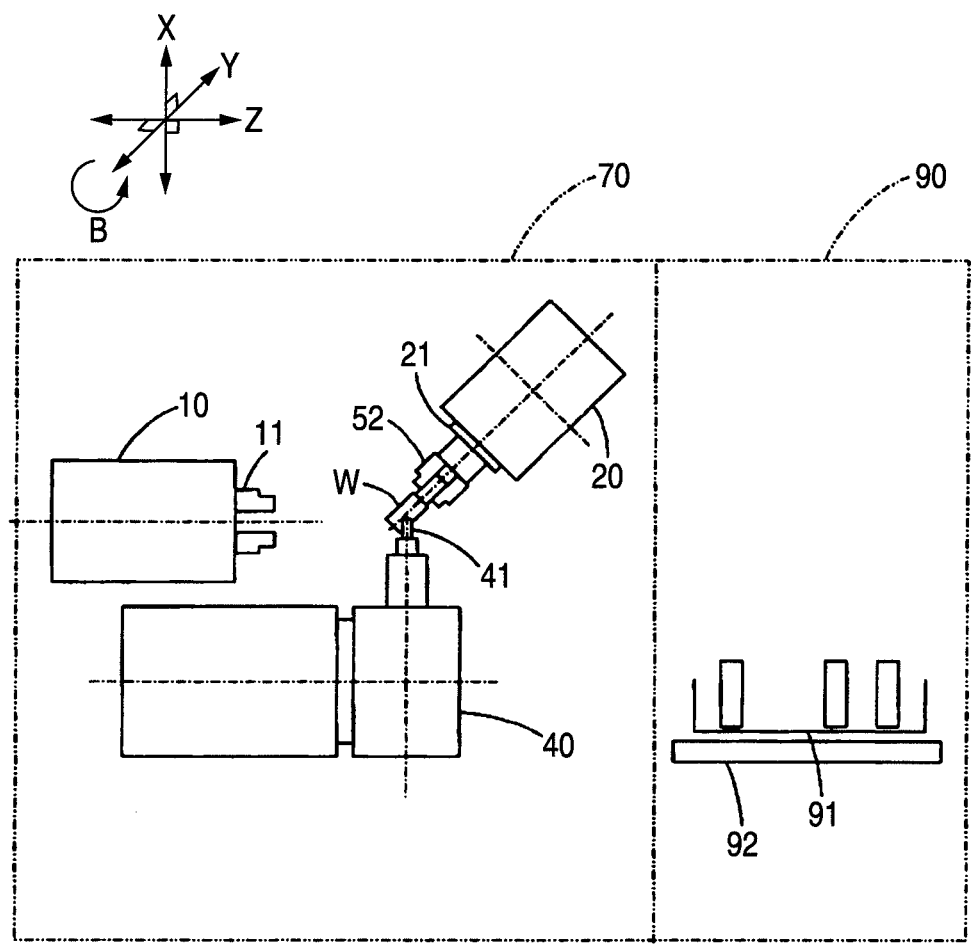
FIG. 7 is a schematic illustration showing how a back-machining operation is performed on a workpiece.

FIG. 7 is a schematic illustration showing how a back-machining operation is performed on the workpiece W. The tool spindle stock 20 with the workpiece W chucked by the chucking unit 52 is moved to a position at which the other end (opposite end of the machined end) of the workpiece W is brought into contact with the tool 41 of the tool post 40. The tool 41 is applied to the other end of the workpiece W and a predetermined back-machining operation is performed. It is possible to perform various machining operations on the other end of the workpiece W such as turning, cross hole drilling or end hole drilling. The turret of the tool post 40 may be revolved so that the tool 41 can be appropriately changed as required in a series of machining. The tool spindle stock 20 may be controlled under B-axis control. Therefore, as shown in FIG. 7, the tool 41 may be applied to the workpiece W with the axis of the tool spindle 21 inclined with respect to the axis of the tool 41, providing an precise machining of an inclined face of the workpiece W. The position of the tool post 40 at the time of performing a back-machining operation is basically different from the position at the time of front-machining. The position of the tool post 40 at the time of back-machining is located distant from the headstock 10 in the direction of Z-axis.

After completion of back-machining of the workpiece W, the tool spindle stock 20 returns the workpiece W to the pallet 91.

Figure 8:
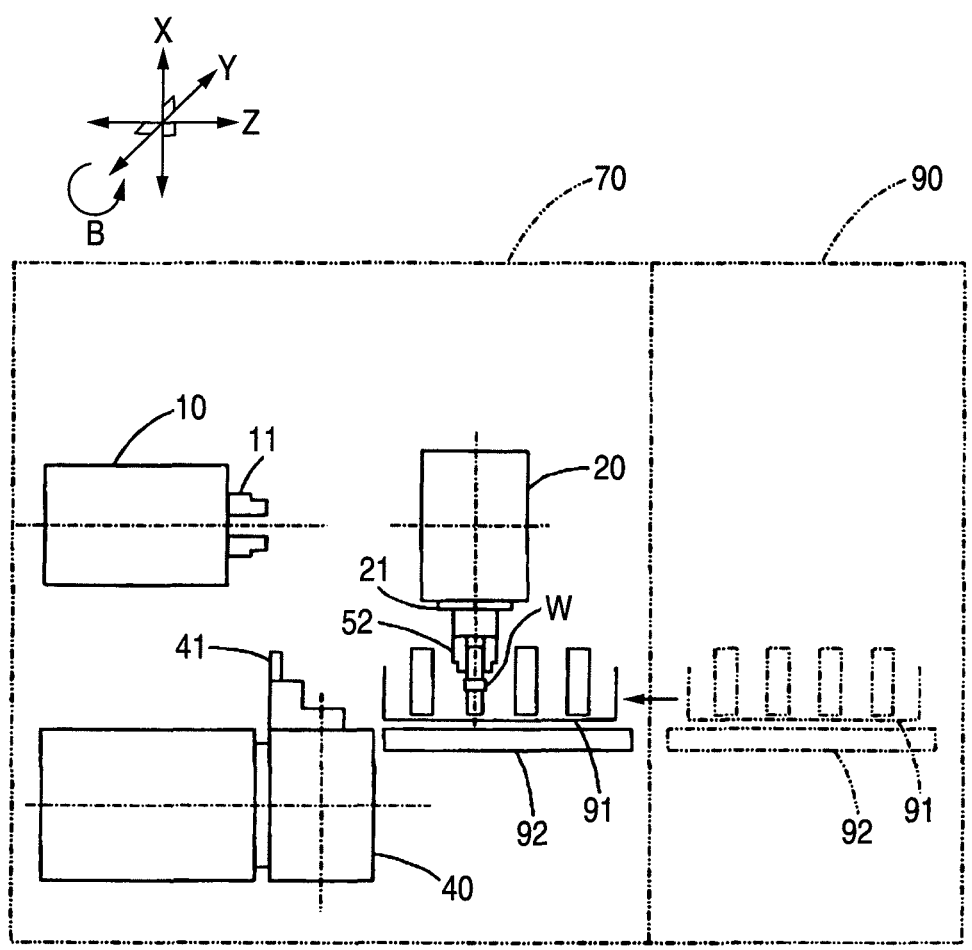
FIG. 8 is a schematic illustration showing how a workpiece is returned to a pallet.

FIG. 8 is a schematic illustration showing how the workpiece W, both of whose ends have been machined, is returned to the pallet 91. The pallet 91 may stand by at the pallet movement position in the machining chamber 70 in a period of time from when a pre-machined workpiece is taken by the tool spindle stock 20 until a back-machining operation is completed. However, to avoid the risk of interference with movement of the tool spindle stock 20 and other components, as shown in FIGS. 2 to 7, the pallet 91 may be once returned to the pallet station 90 by the pallet carrier 92 and again moved to the pallet movement position after completion of back-machining.

The tool spindle stock 20 carrying the workpiece W, both of whose ends have been machined, is moved to a predetermined position, which is a position above the pallet 91 located at the pallet movement position, opposing in the direction of X-axis to a vacant space that was originally occupied by the workpiece W. Then, the tool spindle stock 20 is further moved in the direction of X-axis and brought closer to the pallet 91. At the same time, clamping of the workpiece W by the chucking unit 52 is released and the workpiece W is returned to the pallet 91.

Performing a series of machining operations on each workpiece W carried by the pallet 91 allows mass-production of precision parts having multiple machined faces.

As described above, in the NC lathe 110 of the embodiment, the chucking unit 52 is detachably attached to the tool spindle 21 of the tool spindle stock 20, which is movable in the directions of X-axis, Y-axis and Z-axis and also controllable under C2-axis control and B-axis control. With the workpiece W, one of whose ends (front-end) has been machined, chucked by the chucking unit 52, the tool spindle stock 20 is brought to the position substantially opposing the tool post 40 in the X-axis direction, thereby a back-machining operation is performed with the tool 41 on the other end (back-end) of the workpiece W. Accordingly, a conventional backworking attachment for chucking the workpiece W for performing a back-machining operation is not required in the machining chamber 70. As a result, the NC lathe 110 can be downsized and the apparatus cost can be reduced.

Figure 13:
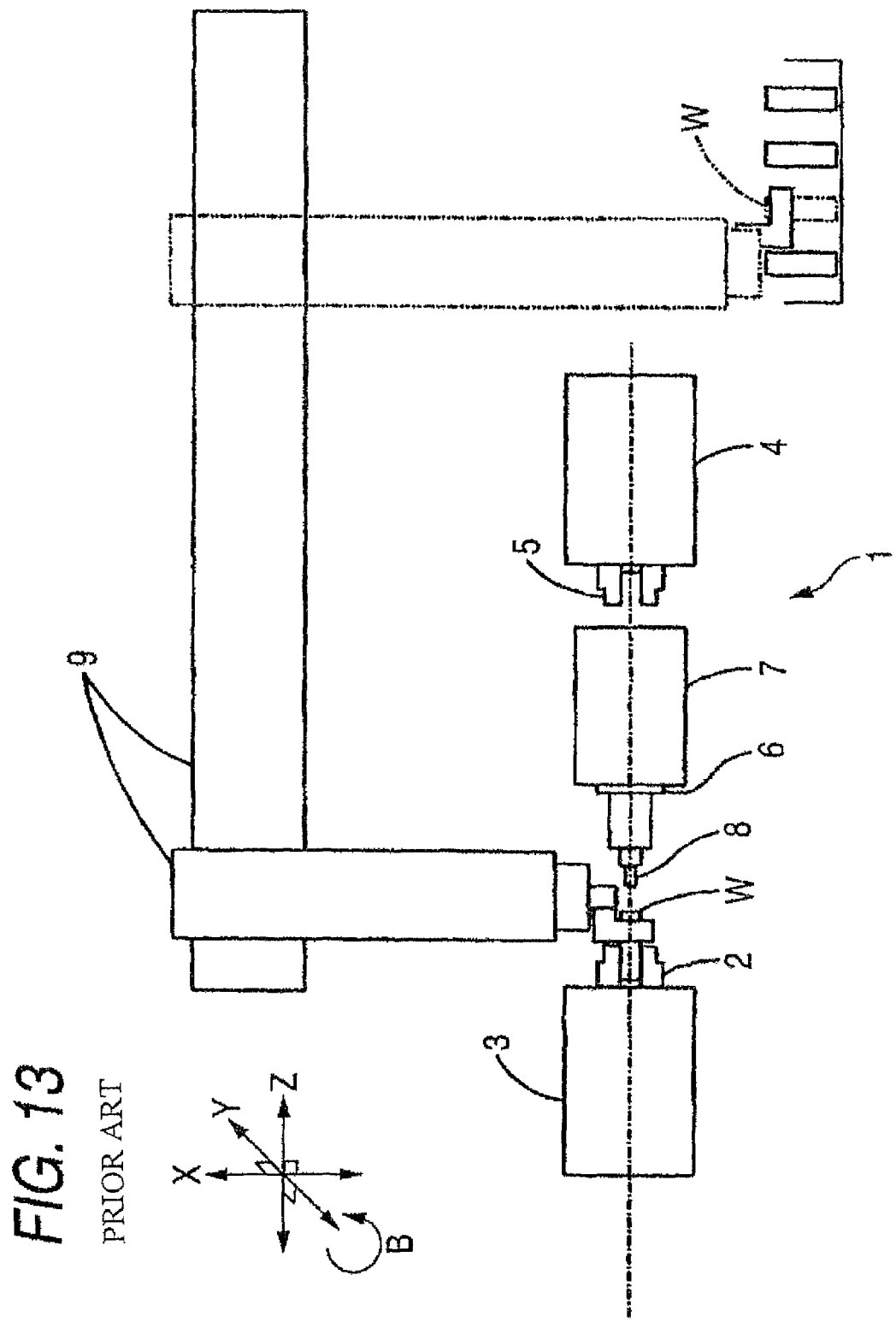
FIG. 13 is another schematic illustration showing a configuration of a conventional NC lathe.

In a conventional machine in which the backworking attachment is provided in the machining chamber, like the NC lathe 1 shown in FIG. 13, a loading/unloading unit 9 is provided to supply the workpiece W to the main spindle 2. The supply passage of the loading/unloading unit 9, however, makes a detour to avoid the interference with the backworking attachment 4 and tool spindle stock 7. In the embodiment without the backworking attachment, the pallet 91 can be moved to a pallet movement position close to the tool spindle stock 20 by the pallet carrier 92. Then, the chucking unit 52 of the tool spindle stock 20 takes and returns the workpiece W from and to the pallet 91. Therefore, delivery of the workpiece W can be very smoothly done before and after machining. Accordingly, machining time can be shortened. Since the loading/unloading unit 9 is not necessary, the lathe can be downsized and the apparatus cost can be reduced.

The pallet station 90 of the embodiment described above has the pallet carrier 92. However, for example, the pallet 91 may be fixed in the pallet station 90 and a movement range of the tool headstock 20 having the chucking unit 52 attached to the tool spindle 21 may be expanded so as to reach the workpiece W on the fixed pallet 91. In this case, the pallet carrier 92 may be eliminated. Therefore, the apparatus cost can be further reduced.

In the present invention, variations can be made other than the embodiment described above. The above explanations are made on an assumption that objects to be machined by the NC lathe 110 are workpieces W that have been cut off one by one. However, the workpiece W may be replaced with a bar material (bar material S in FIG. 9).

Figure 9:
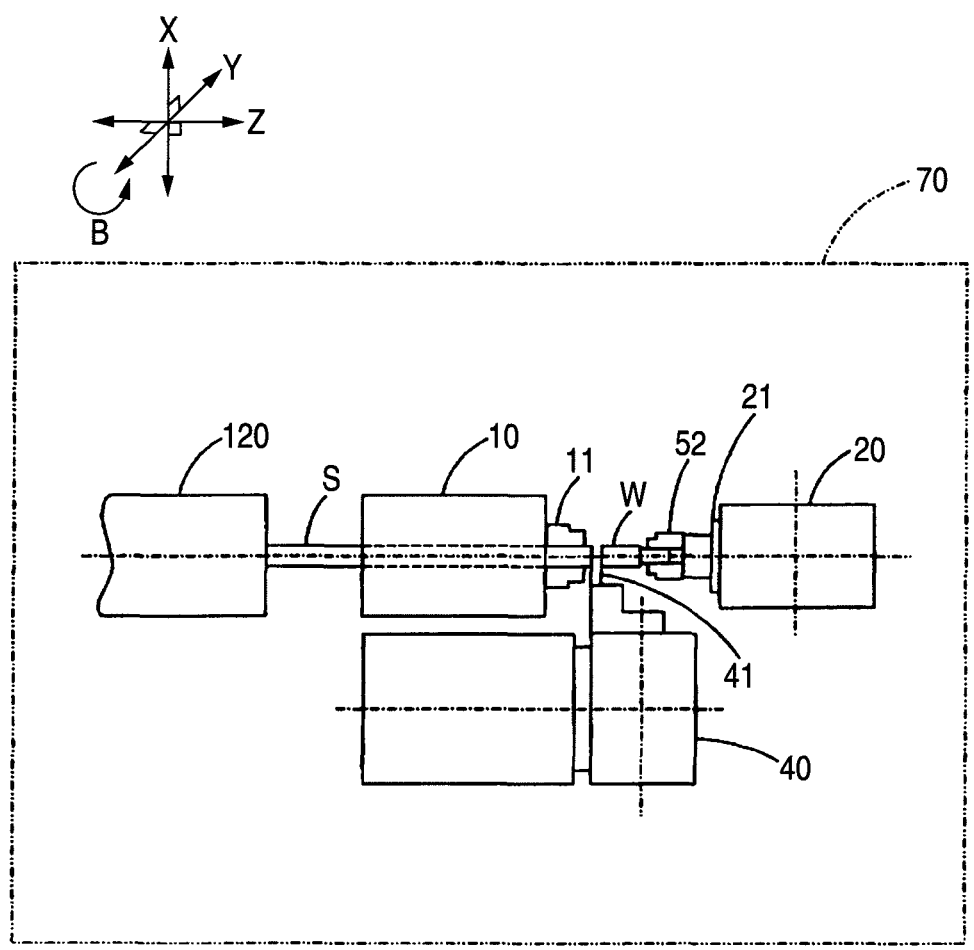
FIG. 9 is a schematic illustration showing part of a configuration of an NC lathe in accordance with the second embodiment of the present invention.

As shown in FIG. 9, the bar material S is supplied from one side of the headstock 10 (the left side in the drawing) by a bar feeder 120. The bar material S is fed in the Z-axis direction through the center of the headstock 10 and chucked by the main spindle 11 with the front end protruded from the other side of the headstock 10 (the right side in the drawing).

A front-machining operation is performed on the front end of the bar material S chucked by the main spindle 11, with the tool 51 attached to the tool spindle stock 21 and/or with the tool 41 mounted on the tool post 40. Next, in the tool spindle 21, the tool 51 is replaced with the chucking unit 52. As shown in FIG. 9, the front end of the bar material S is clamped by the chucking unit 52. Next, the tool post 40 is moved to a position where the tool 41 may be applied to the foot of the front end of the bar material S protruded from the main spindle 11. Then, the bar material S is cut off at the foot by using the tool 41. That is, the front end of the bar material S is cut off into a piece, that is the workpiece W. The tool spindle 21 is moved with the workpiece W clamped by the chucking unit 52 to a position where the workpiece W may be brought into contact with the tool 41 of the tool post 40. Then, a back-machining operation is performed on the workpiece W with the tool 41. The finished workpiece W may be returned to the pallet 91 and carried outside the machining chamber 70 by the pallet carrier 92.

Figure 10:
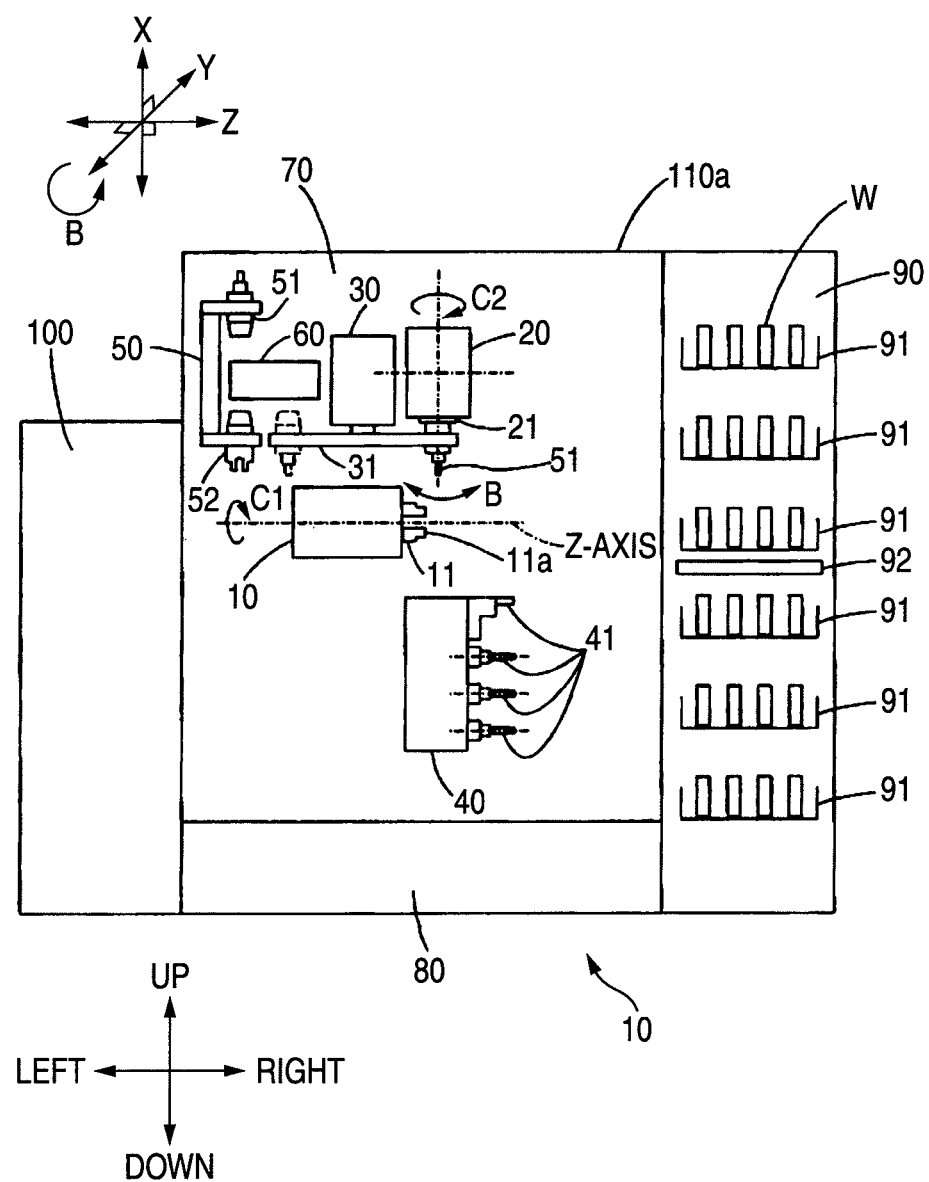
FIG. 10 is a schematic illustration showing part of a configuration of an NC lathe in accordance with the third embodiment of the present invention.

Another example is shown in FIG. 10. As shown in the drawing, the tool post 40 may be fixed in the machining chamber 70 and provided with a plurality of tools 41 directed in the direction of Z-axis. Even when the tool post 40 is fixed at a position, the tool spindle stock 20 is still movable in the directions of X-axis, Y-axis and Z-axis. Therefore, it is possible to perform a back-machining operation with the tool 41 of the tool post 40 on the workpiece W chucked by the chucking unit 52 attached to the tool spindle 21. As described above, the tool spindle stock 20 is controllable under B-axis control. Therefore, an inclined face of the workpiece W can be precisely machined by using the tool 41 with the axis of the tool spindle 21 inclined with respect to the axis of the tool 41 directed in the direction of Z-axis.

Forms of the tool post 40 and the tool 41 are not limited to specific forms shown in the drawing. A plurality of tools 41 may be respectively arranged so that they are perpendicular to one of the XY-plane, the XZ-plane and YZ-plane.

It should be noted that the present invention is not limited to the above specific embodiments and variations. Variations can be made without departing from the scope and spirit of the claim of the invention.

A specific example of the workpiece carrier may be a device in which the workpiece W may be singly moved without using the pallet 91 and the pallet carrier 92. Examples of this device are a belt conveyer and an arm loader.

What is claimed is:

1. A machine tool comprising:
a main spindle adapted to be rotatable about an axis with a workpiece chucked thereby;
a tool spindle adapted to rotate a tool about a tool rotation axis and configured to move in directions of three axes perpendicular to each other and configured to pivot about one of the three perpendicular axes, the one axis being perpendicular to the axis of rotation of the main spindle and to the tool rotation axis;
an automatic tool changer adapted to selectively detachably attach a first tool and a chucking unit to the tool spindle, the first tool being used for machining the workpiece chucked by the main spindle, the chucking unit being used for chucking the workpiece; and a tool post having a second tool mounted thereon, the second tool being used for machining the workpiece chucked by the chucking unit attached to the tool spindle;

a workpiece carrier adapted to support a plurality of workpieces mounted thereon, the workpiece carrier being adapted to move within reach of the chucking unit attached to the tool spindle, a numerical controller configured to cause the tool spindle with the chucking unit attached thereto to pivot about the one axis to position the tool rotation axis at a first orientation, to cause the tool spindle with the chucking unit at the first orientation to pick up any one of the workpieces from the workpiece carrier, and to cause the tool spindle with the chucking unit and the one picked-up workpiece to pivot about the one axis to a second orientation at which the tool rotation axis is transverse with respect to the first orientation thereof, and to cause the tool spindle with the chucking unit at the second orientation to hand off the one picked-up workpiece to the main spindle, wherein the tool post is configured to move relative to the main spindle in directions of at least two of the three axes that are perpendicular to each other, wherein the first tool and the second tool are configured to simultaneously machine the workpiece held by the main spindle, when the first tool is attached to the tool spindle.

2. The machine tool according to claim 1, wherein the tool post is configured to move the second tool in a plane containing the axis of rotation of the main spindle, the second tool being used for machining the workpiece chucked by the main spindle.

3. The machine tool according to claim 2, wherein the tool spindle is adapted to return the workpiece chucked by the chucking unit to the workpiece carrier.

4. The machine tool according to claim 3, wherein the workpiece carrier includes a pallet to carry the workpiece and a pallet carrier to move the pallet, and the tool spindle is adapted to pick up one of the workpieces from the pallet moved by the pallet carrier within reach of the chucking unit and to return the one workpiece to the pallet.

5. The machine tool according to claim 4, wherein the tool spindle has a supply passage formed therein for supplying pressurized coolant to the chucking unit, the chucking unit being operated in response to the supply of coolant.

6. The machine tool according to claim 3, wherein the tool spindle has a supply passage formed therein for supplying pressurized coolant to the chucking unit, the chucking unit being operated in response to the supply of coolant.

7. The machine tool according to claim 2, wherein the tool spindle has a supply passage formed therein for supplying pressurized coolant to the chucking unit, the chucking unit being operated in response to the supply of coolant.

8. The machine tool according to claim 1, wherein the tool spindle is adapted to return the workpiece chucked by the chucking unit to the workpiece carrier.

9. The machine tool according to claim 8, wherein the workpiece carrier includes a pallet to carry the workpieces and a pallet carrier to move the pallet, and the tool spindle is adapted to pick up one of the workpieces from the pallet moved by the pallet carrier within reach of the chucking unit and to return the one workpiece to the pallet.

10. The machine tool according to claim 9, wherein the tool spindle has a supply passage formed therein for supplying pressurized coolant to the chucking unit, the chucking unit being operated in response to the supply of coolant.

11. The machine tool according to claim 8, wherein the tool spindle has a supply passage formed therein for supplying pressurized coolant to the chucking unit, the chucking unit being operated in response to the supply of coolant.

12. The machine tool according to claim 1, wherein the tool spindle has a supply passage formed therein for supplying pressurized coolant to the chucking unit, the chucking unit being operated in response to the supply of coolant.

* * * * *